Nov. 8, 1966

A. R. TOKARZEWSKI 3,283,653

PANORAMIC OPTICAL SYSTEM HAVING AN ANNULAR AFOCAL LENS SYSTEM

Filed Feb. 20, 1963

ALBERT R. TOKARZEWSKI
*INVENTOR.*

BY *Karl G. Ross*

AGENT

INVENTOR.
ALBERT R. TOKARZEWSKI
BY
Karl F. Ross
AGENT

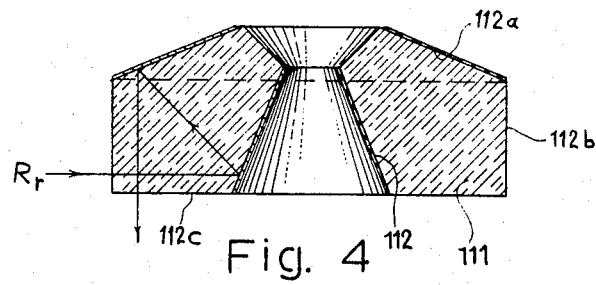
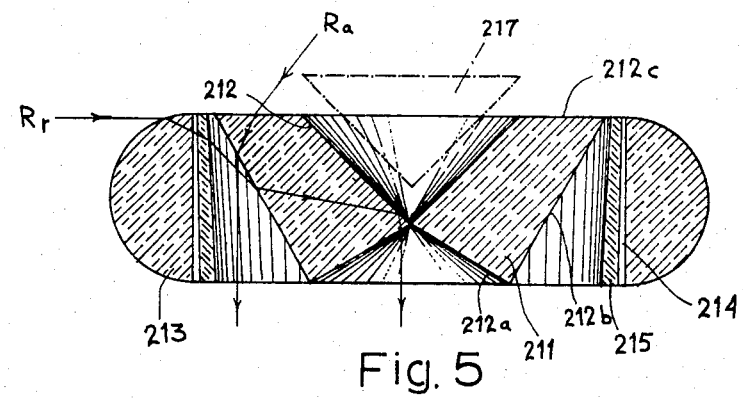
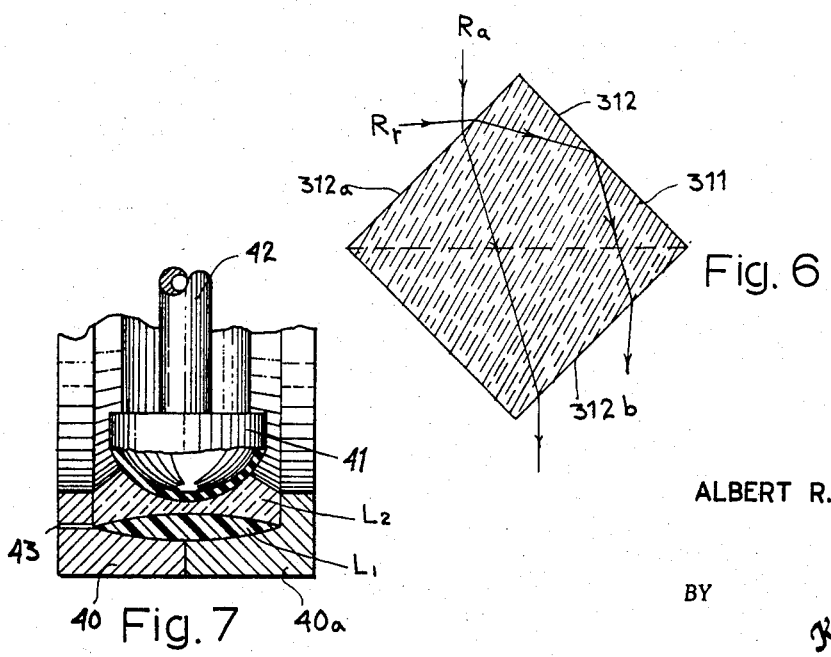

United States Patent Office 3,283,653
Patented Nov. 8, 1966

3,283,653
PANORAMIC OPTICAL SYSTEM HAVING AN
ANNULAR AFOCAL LENS SYSTEM
Albert R. Tokarzewski, 175 W. 48th St., Bayonne, N.J.
Filed Feb. 20, 1963, Ser. No. 259,893
10 Claims. (Cl. 88—57)

My present invention relates to an optical system with a panoramic field of view. This application is a continuation-in-part of my pending application Ser. No. 147,922, filed October 26, 1961 and now abandoned.

The general object of this invention is to provide an optical system having a field of view which extends over a full 360° around a (usually vertical) central axis and accommodates incident rays within a wide angular range in any plane passing through this axis, in combination with means for deflecting all these incident rays substantially in axial direction toward a projection surface or other receiving means; such a system may also be used to convert the generally axial beam of incident light into an annular outgoing beam of spreading cross-section.

Other objects of this invention are the provision of improved annular lens combinations, adapted to be used in a system of this character, and of a method of assembling such lenses.

In accordance with this invention I provide a central reflecting element, such as a generally cylindrical refractive body with a substantially conical internal reflecting surface, and, in combination therewith, a lense system of positive power coaxial with the central element, this lens system including at least one annular lens of dispersive character (with reference to rays incident in an axial plane) spacedly surrounding the central body for directing the incident light rays to it.

The annular clearance provided between the surrounding dispersive lens member and the refractive central body results in the existence of an added pair of refractive surfaces designed to direct incident rays of widely different initial inclination toward the central body for deflection in a substantially axial direction and focusing upon a receiving plane transverse to the axis. The focusing may be accomplished by conventional optical components positioned along the axis in the path of the outgoing rays and/or by further annular lens members concentrically disposed within the aforementioned clearance. Some of the components of the system other than the outer dispersive annular lens member, such as one or more toroidal lenses of collective character, may be closely juxtaposed with the central body and may even be integral therewith.

In many instances it will be desirable, for the more convenient guidance of monochromatic rays and/or for the correction of achromatism in the case of polychromatic light, to juxtapose two or more annular lens members of different refractive indices with little or no clearance. In contradistinction to conventionl photographic or projection systems, in which the juxtaposition of lenses with or without cementing involves no major difficulties, such an assembly cannot be readily realized in the centrally symmetrical optical system of this invention if, as is usually the case, the confronting lens surfaces are other than plane. I have found, however, that this problem can be solved if at least the lens member of lower refractive index is made of a transparent plastic material, e.g. a polyacryllate or polystyrene, which is molded onto the preformed adjoining lens member, such as a toroidal glass lens ground to the required dimensions.

A further feature of my invention resides in the provision of a generally conical insert for the central body adapted to permit the passage of approximately axial rays through the reflecting surface of the latter. In this case the apex angle of the reflecting surface and the direction of the incoming rays within the central body are preferably so chosen that these rays include with the reflecting surface an angle less than the critical angle of the transparent material constituting the central body (as measured with reference to that surface) so that total internal reflection occurs at that surface; the transparent conical insert, which may be separated from the reflecting surface by a narrow air gap, then allows the axially impinging rays to traverse the surface and to continue in the same general direction as the reflected rays since these axially oriented rays include an angle greater than the critical angle with the reflecting surface. Greater latitude in design, at the expense of reduced brightness, exists in the case of semi-silvered, partly transparent reflecting surfaces. In this manner I am able to supplement the field of panoramic view by a further circular or annular region centered on the axis of the refractive body and disposed on the side of that body remote from the receiving plane.

It is to be understood that such terms as "incident" and "outgoing" rays, as used hereinbefore and in the following detailed description and claims, have reference only to the case in which a system according to this invention is used as a light-receiving device, e.g. in a photographic camera, and that the terminology would have to be reversed if the system were employed as a light emitter such as an optical projector or as a wide-angle beam source. Among other light-receiving systems to which the invention is applicable there may be mentioned a panoramic detector of incident luminous radiation associated with apparatus for indicating and/or recording the location of such incidence.

My invention will be described in greater detail with reference to the accompanying drawing in which:

FIGS. 4–6 are cross-sectional views of different refractive bodies adapted to serve as the central element of a system according to my invention; and FIG. 7 illustrates my novel method of forming composite annular lenses for a system of the type herein disclosed.

Figure 1:
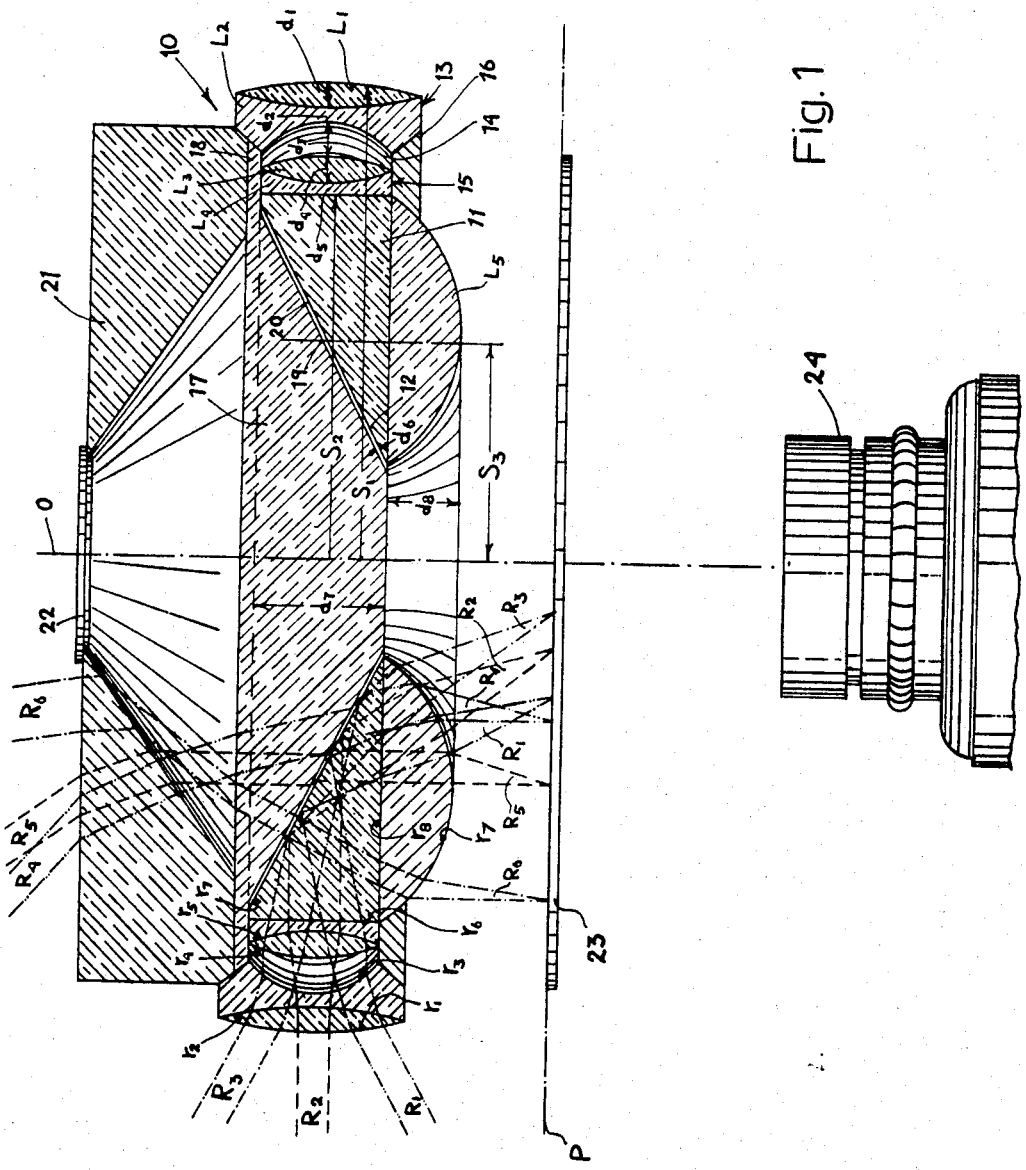
FIG. 1 is a cross-sectional view of a panoramic optical system embodying my invention.
Figure 2:
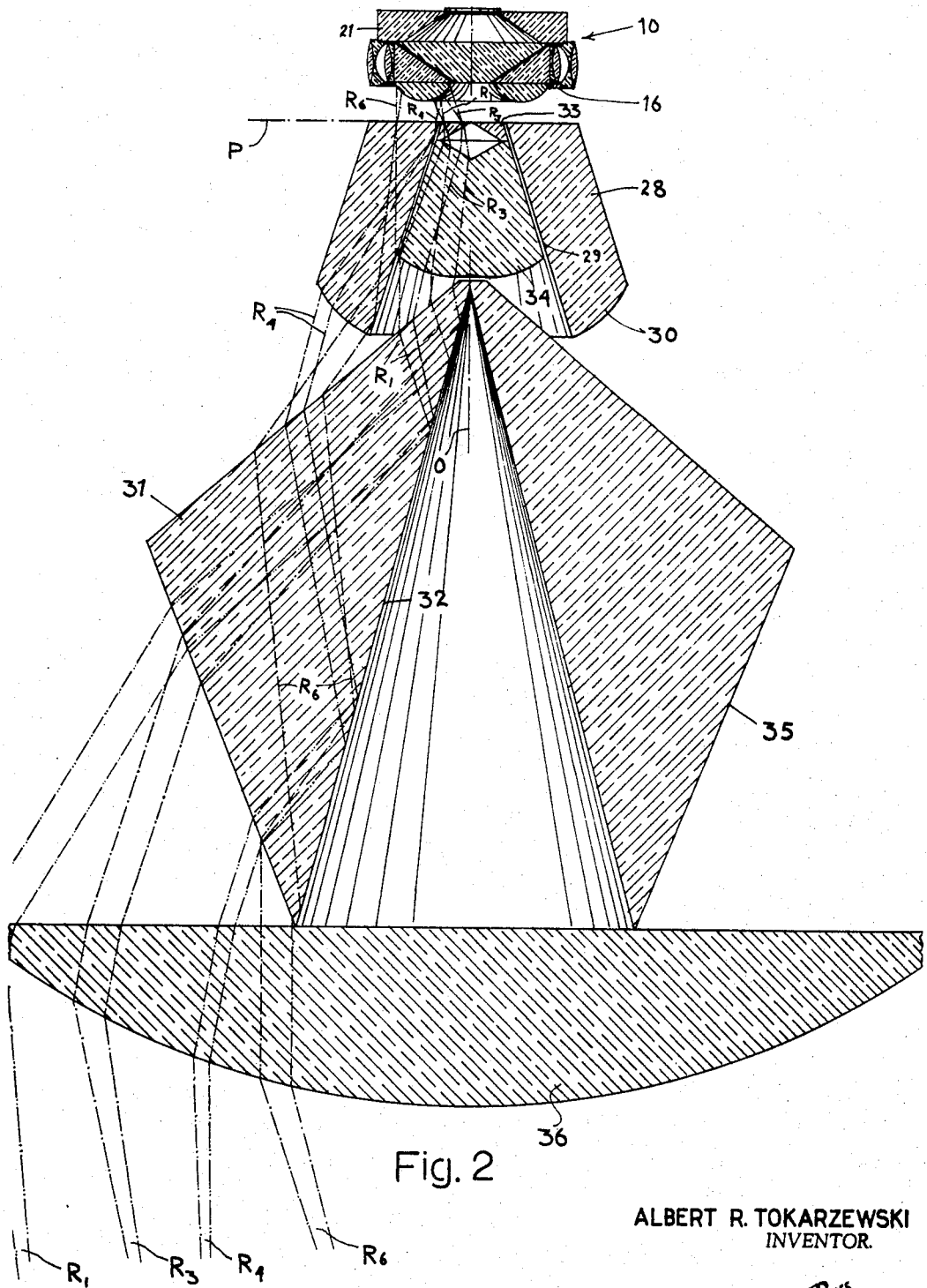
FIG. 2 is a view similar to FIG. 1 but drawn to a reduced scale, showing the panoramic system according to the invention forming part of a photographic objective.

The panoramic optical system 10 shown in FIGS. 1 and 2 comprises a central refractive body 11 with a frustoconical surface 12. Body 11 is centered on a vertical axis O and is of polygonal axial cross-section so as to function as an annular optical prism. Other optical components centered on the same axis include an annular lens member 13 having an axial cross-section in the shape of a negative meniscus turning its concave side toward the axis O; the member 13 consists of an outer annular lens $L_1$ of positive cross-sectional power and an adjoining annular lens $L_2$ of negative cross-sectional power. An annular clearance 14 separates the member 13 from another annular compound lens member 15 composed of a positive annular lens $L_3$ and a negative annular lens $L_4$. Lens $L_4$ adjoins the annular prism 11 without clearance and is supported by an opaque mounting ring 16 of roughly trapezoidal cross-section to which the outer member 13 is adhesively bonded or otherwise secured. Ring 16 also holds in position a toroidal lens $L_5$ of plano-convex cross-section which supports the central body 11 and may be cemented onto its flat underside.

Another refractive element 17, of generally frustoconical configuration, rests with a flange 18 on the lens members 13 and 15 as well as on the body 11 so that its own outer conical surface 19 is closely spaced from the reflecting surface 12 of that body by a narrow annular air gap 20. Element 17 is overlain by another element 21 of polygonal cross-section constituting an axially symmetrical optical prism. An opaque cover 22 may be used to close the central bore of element 21 against directly incident light rays.

The outer annular dispersive component 13 receives incident rays from a distant object or objects here assumed to be positioned at infinity, three bundles of parallel rays $R_1$, $R_2$ and $R_3$ being shown by way of illustration. The rays $R_1$ arrive at an angle of approximately $-30°$ with reference to the horizontal and are refracted into a more nearly horizontal position by the lenses $L_1$ and $L_2$, the rays $R_3$ being mirror-symmetrically refracted after arriving at an angle of about $+30°$. The intermediate rays $R_2$ originally pass substantially horizontally along the plane of symmetry of the annular array 13, 15 and generally maintain their original direction until they strike the reflecting surface 12. All these rays, upon being focused by the collective component 15, strike the surface 12 (whose inclination to the horizontal is here 27½°) at an angle below the critical angle which, if the prism 11 consists of a plastic material with a refractive index $n_d \approx 1.5$, is of the order of 48° as measured with reference to this surface (42° from the surface normal). Further focusing occurs, after reflection, in the toroidal lens $L_5$ whereby the ray bundles $R_1$, $R_2$ and $R_3$ are concentrated upon a focal plane P. Other ray bundles $R_4$, $R_5$ and $R_6$ pass at progressively steeper angles, all greater than that of ray bundle $R_3$, through the top prism 21 and through the transparent insert 17 whose refractive index $n_d$ is assumed to be similar to that of prism 11; rays $R_4$, $R_5$ and $R_6$, after refraction at the boundaries of the two annular bodies 21 and 17, impinge upon the surface 19 at an angle greater than the aforementioned critical angle so as to penetrate this surface and, after undergoing a slight lateral shift at the gap 20, to enter the members 11 and $L_5$ whereupon they converge upon the same horizontal plane P as the rays $R_1$, $R_2$ and $R_3$. This is true because the system 13, 15 is substantially afocal so that both groups of rays $R_1$–$R_3$ and $R_4$–$R_6$ arrive as bundles of substantially parallel rays at the prism surface 12 and, therefore, at the junction of prism 11 with toroidal lens $L_5$. It will be understood that the foregoing discussion of the ray paths applies to an axial plane of the illustrated optical system and that a set of parallel incident rays in a horizontal plane, i.e. a plane transverse to the optical axis O, will undergo a certain dispersion at the concentric surfaces which they encounter. This dispersion invariably occurs in all concentric optical systems of the general character here described and will not be considered further.

It will be observed that the ray bundles $R_1$–$R_6$ leave the toroidal lens $L_5$ on the same side of the axis O on which they entered the system so that no cross-over to the diametrically opposite side occurs. They are, however, partly transposed from their original relative position; where necessary, this transposition may be compensated by suitable means, e.g. in the manner described hereinafter with reference to FIG. 2.

As shown in FIG. 1, the ray bundles $R_1$–$R_6$ are focused on a receiving plate 23 located on the level of focal plane P. Plate 23 may be a ground-glass plate bearing a suitable reticle with markings denoting the elevational and azimuthal positions of the objects from which the ray bundles $R_1$–$R_6$ originate. A conventional photographic camera 24 may then record the luminous spots from these ray bundles together with the markings of the reticle.

The plate 23 could also be a disk rotatable about axis O, this disk being opaque except for a narrow radial strip adapted to be transluminated by the light of the incident ray bundles whereby the presence of such ray bundles can then be recorded, for example, by a camera 24 designed in this instance as a motion-picture camera. When the disk 23 is rotated in synchronism with the advance of the film through camera 24, a permanent record is made of all the luminous objects recorded at specified elevations in successive azimuthal positions of the disk. In this manner a panoramic map of surrounding light sources may be plotted, e.g. for surveying purposes.

The annular system 10 of FIG. 1 (as also that of FIG. 3) is shown in the drawing in its true proportions. In addition, representative values for the radii of curvature, thicknesses, separations and refractive indices of the lenses $L_1$–$L_5$ and the prisms 11, 17, 21 shown in FIG. 1 are listed in the following Table A. The units of length given in the Table for the linear dimensions of the system are arbitrary but may be considered as millimeters. Radii designated by the letter $r$ ($r_1$ etc.) relate to curvatures in the vertical axial plane; radii represented by the letters S ($S_1$ etc.) apply to curvatures in transverse horizontal planes and are measured from the axis O.

TABLE A

| | | Axial radii | Thicknesses and separations | $n_d$ | Transverse radii |
|---|---|---|---|---|---|
| 13 | $L_1$ | $r_1=+91$ | $d_1=4$ | 1.5 | $S_1=91*$ |
| | $L_2$ | $r_2=-91$ | $d_2=2$ | 1.75 | |
| | | $r_3=+15.5$ | $d_3=8.5$ | Air space | |
| 15 | $L_3$ | $r_4=+31$ | $d_4=6$ | 1.75 | |
| | $L_4$ | $r_5=-31$ | $d_5=1.5$ | 1.5 | |
| | | $r_6=\infty$ | $d_6=1$ | Air space | $S_2=69*$ |
| | | $r_7=\infty$ | | | $S_3=44*$ |
| | 11 | $r_8=\infty$ | $d_7=2.5$ | 1.5 | |
| | $L_5*$ | $r_9=-30$ | $d_8=1.5$ | 1.75 | |

*The parameters of lens $L_5$ are given only for the sake of completeness and are intended to be merely illustrative since this lens is not an essential part of the system 10 but is simply illustrative of any means for focusing the rays from prism 11. The plane P is, in fact, idealized in the drawing as the locus of the foci of ray bundles $R_1$–$R_6$ will not be perfectly planar with a single toroidal lens below the prism, as shown. The magnitudes of radii $S_1$, $S_2$ and $S_3$ are arbitrary inasmuch as they could be increased at will beyond a minimum length necessary to prevent the inwardly inclined emerging rays $R_1$, $R_2$, $R_3$ from crossing the axis O. With the selected value of $S_1$, however, the outer face of lens $L_1$ forms part of a spherical surface. Prism 17 has the same refractive index ($n_d=1.5$) as prism 11 whereas prism 21, whose internal generatrices include with the horizontal an angle of 35°, is assumed to have a higher index of refractivity ($n_d=1.75$).

In FIG. 2, I have shown the same general system 10 with its focal plane P disposed substantially at the outer surface of an annular body 28 having a frustoconical internal reflecting surface 29. Body 28 acts as a transposition prism for the rays $R_{4-6}$ (the bundle $R_5$ being omitted in this FIGURE for the sake of clarity) and, by virtue of its torodially convex lower surface 30, focuses these rays upon another annular prism 31 with a conical internal reflecting surface 32. A further axially symmetrical prism 33 faces a generally frustoconical transparent body 34 in the interior of annular body 28; the members 33 and 34 have inversely conical central cavities in which the ray bundles $R_1$–$R_3$ are refracted without transposition (ray bundle $R_2$ having been omitted for clarity's sake) so as to remain on one side of the optical axis O. A further transposition takes place within the prism 31 with reference to the ray groups $R_1$–$R_3$ and $R_4$–$R_6$ whereupon all the ray bundles emerge in their original order from the lower refractive surface 35 of prism 31. Since the lower surface of central body 34 is also annularly convex, all the ray bundles (whose primary focal points lie in the plane P) are substantially parallel upon emerging from surface 35. They are then refocused upon a secondary focal plane, not shown, by a planar convex lens 36 of sufficient diameter to intercept all the rays delivered by the system 10. It will be understood that lens 36 is representative of any conventional optical system for focusing a field of parallel rays onto an image plane. Thus, lens 36 will project upon such a plane a picture representing a flattened image of all the objects appearing within a panoramic field of view which extends over a full 360° in the horizontal plane and an arc of at least 240° in any vertical plane. Naturally, the components 28, 31, 33 and 34 could also be replaced by other systems centered on axis O for focusing the emerging rays of assembly 10 upon a transverse plane. It will also be apparent that the direction of the rays could be readily reversed so as to have them originate below the collective lens 36 and emerge from the system 10 in the direction of incident rays $R_1$–$R_6$ in FIG. 1.

Figure 3:
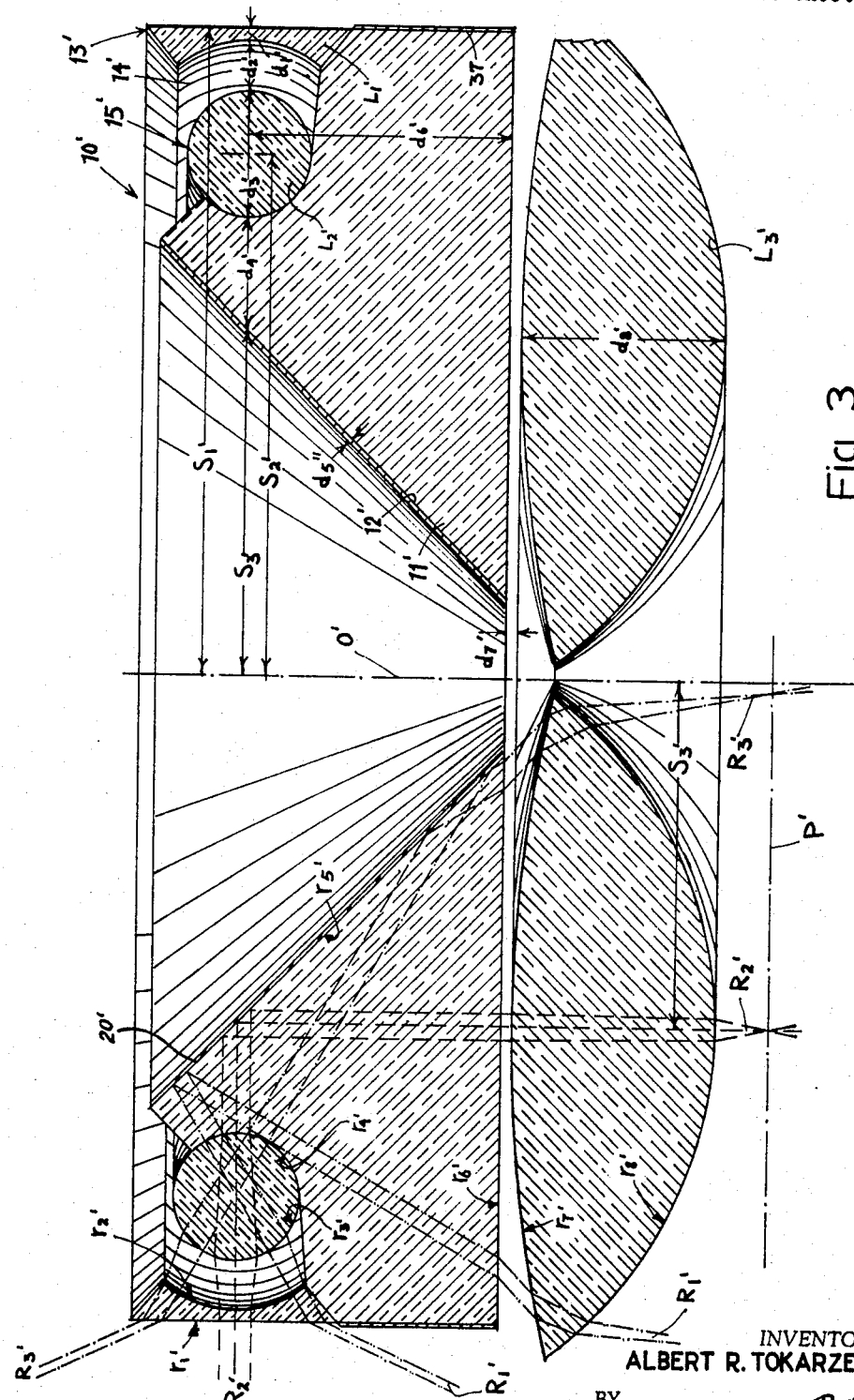
FIG. 3 is a view similar to FIG. 1 of a modified panoramic system.

The system 10' shown in FIG. 3 has the same general construction as the system 10 of the preceding figures in that a dispersive outer annular refractive member 13', consisting of a lens $L_1'$, surrounds a collective annular refractive member 15' of toroidal configuration, consisting of a lens $L_2'$, the two lens members 13', 15' being separated from each other by an annular air space 14' and together constituting an afocal system by which incident rays $R_1'$, $R_2'$ and $R_3'$ are directed in parallel-ray bundles upon an internal conical reflecting surface 12' of an anular prism 11'. Surface 12', whose generatrics include an angle of 45° with the horizontal, is externally coated with a silver layer 20' to assure its total reflectivity. The bundles of parallel rays emerging from the lower surface of prism 11' are focused onto a horizontal image plane P', before crossing the optical axis O', by a positively refractive optical component here shown as an annular lens $L_3'$. The lower part of prism 11' is surrounded by non reflecting opaque shielding 37.

It will be seen that the system 10' is capable of focusing upon plane P' a field of incident rays with an angle of elevation ranging approximately from −65° (rays $R_1'$) to +65° (rays $R_3'$), the total field angle being thus about 130°. This panoramic field can therefore be reproduced in planar form on a photosensitive film or other receiving surface (e.g. ground-glass plate) positioned at the level of plane P'.

The parameters of the components of system 10' shown in FIG. 3 are set forth in Table B below.

TABLE B

| | Axial radii | Thicknesses and separations | $n_d$ | Transverse radii |
|---|---|---|---|---|
| (13') $L_1'$ | $r_1' = \infty$ | $d_1' = 2.5$ | 1.75 | $S_1' = 131*$ |
| | $r_2' = +47$ | $d_2' = 11$ | Air space | |
| (15') $L_2'$ | $r_3' = +12.5$ | $d_3' = 25$ | 1.5 | $S_2' = 105*$ |
| | $r_4' = -12.5$ | $d_4' = 22.5$ | 1.75 | |
| 11' | $r_5' = \infty$ | $d_5'' = 1$ | Air space | $S_3' = 70*$ |
| | | $d_6' = 5.5$ | 1.75 | |
| | $r_6' = \infty$ | $d_7' = 2.5$ | Air space | |
| $L_3'*$ | $r_7' = +250$ | $d_8' = 42.5$ | 1.75 | |
| | $r_8' = -80$ | | | |

*The observations made with reference to lens $L_5$ and radii $S_1$, $S_2$, $S_3$ (Table A) apply also to lens $L_3'$ and radii $S_1'$, $S_2'$, $S_3'$.

The afocal system $L_1'$, $L_2'$ is so designed that all its curved surfaces have concentric cross-sections, the cross-section of toroidal lens $L_2'$ being a circle. The reflecting surface 12' of prism 11' could also be made partly transparent to enable the downward passage of paraxial light rays impinging upon it from above, either directly or through a complementary transparent insert similar to prism 17 in FIG. 1. The assembly 10', which does not transpose its laterally incident rays, may of course also be used in conjunction with an azimuthal detector system, such as that shown in FIG. 1, having means for rotating the axially projected image relatively to a receiver (or a set of receivers) therefor.

In FIGS. 4–6, I have illustrated several annular elements which may be substituted for the central prismatic body 11 or 11' of the preceding figures. The annular prism 111 shown in FIG. 4 has a silvered or semisilvered internal reflecting surface 112 and a similarly reflecting upper surface 112a, these surfaces being both frustoconical and having generatrices which include an angle of 45° with each other. Since the outer peripheral surface 112b of prism 111 is cylindrical, a radially incident ray $R_r$ passes undeflected into the prism and is then reflected successively at surfaces 112 and 112a so that its final direction, upon emergence from the bottom surface 112c of the prism, is parallel to the axis thereof. The two sets of generatrices are inclined to the horizontal at 22½° and 67½°, respectively.

The prism 111 is an annular version of a body known in planar optics as a pentaprism. A characteristic of this type of prism is that any entering ray will be deviated by a constant angle, i.e. 270°. Prism 111 is shown to be centrally apertured in order to permit paraxial translumination. Its refractive index (though immaterial with respect to the orthogonally incident ray $R_r$ shown in the figure) may be $n_d = 1.5$.

In FIG. 5, I have shown at 211 a prism with a single reflecting surface 212 in the shape of a cone with a 90° apex angle whose generatrices include an angle of 75° with those of its oppositely conical exit surface 212a. The cone defined by the latter surface thus has an obtuse apex angle of 120°. The outer peripheral surface 212b of this prism is also frustoconical and has generatrices perpendicular to those of surface 212a. The annular top surface 212c lies in a plane transverse to the prism axis.

The prism 211 acts in the manner of a transposing crystal to concentrate radially incident rays $R_r$ along a central axial field while permitting rays $R_a$, incident in a generally axial direction, to reach an annular area surrounding this field. A transparent cone 217 may be inserted into the upper aperture of the prism, in juxtaposition with surface 121, in the manner and for the purpose described in connection with insert 17 (FIG. 1) so that paraxial rays can also traverse the central section of the prism.

If it is desired that radially incident rays $R_r$ emerge axially from the lower prism surface 212a, or vice versa, one or more additional optical components must be concentrically disposed around the prism to alter the ray paths. Thus I have shown the prism 211 surrounded by an outer annular lens 213 of plano-convex cross-sectional configuration and an annular transparent body 215 of wedge-shaped cross-section nested in lens 213 with a slight downwardly diverging clearance 214. Thus, lens 213 focuses the horizontally incident rays $R_r$ into a converging bundle which is subsequently defocused by the scattering effect of body 215 so that all its rays, as illustrated for one of them, arrive at the proper angle of inclination at the surface 212b. It will be understood that the elements 213 and 215 could also be made integral with one another, i.e. the inner surface of lens 213 could be made frustoconical rather than cylindrical. The elements 211, 213 and 215 are assumed to have a refractive index $n_d = 1.5$.

The prismatic body 311 shown in FIG. 6 is in the shape of a double cone with an apex angle of 90° at each end, its cross-section thus having the configuration of a square. Lateral rays $R_r$, refracted at the entrance surface 312a, will be internally reflected at the opposite surface 312 which they strike at less than the critical angle (a refractive index $n_d$ of 1.5 being again assumed). Following this internal reflection, the rays then pass outwardly through the adjoining lower surface 312b toward the opposite exit surface 312b where they emerge without undergoing internal reflection. A transposition thus occurs in that the axially incident rays are concentrated in a central axial field whereas the laterally incident rays distribute themselves in a surrounding annular zone.

Some of the systems heretofore described utilize composite annular lens members such as the doublets $L_1$, $L_2$ and $L_3$, $L_4$ in FIG. 1 or the toric lens $L_2'$ with its surrounding body $11'$ in FIG. 3. Other elements, such as the lenses $L_1'$, $L_3'$ and $L_5$, could of course be similarly replaced by doublets or even triplets, in a manner well known per se in planar optics, for an at least partial reduction of chromatic and other aberrations.

Since annular composite lenses with curved internal surfaces ($r_2$ and $r_5$ in FIG. 1, $r_4'$ in FIG. 3) cannot be manufactured in the conventional manner by juxtaposition and cementing of their constituent lenses, I have devised a special method for this purpose which I have illustrated in FIG. 7. This figure shows the making of lens member 13 (FIG. 1) with the aid of a mold composed of two half-shells 40, 40a and the prefabricated annular glass lens $L_2$ serving as a temporary mold core. Lens $L_2$ may be held in place by a variety of devices such as, for example, an array of inflatable heads 41 at the ends of respective spider arms 42 (only one shown). A sprue 43 serves for the admission of a fluid plastic mass into the cavity formed between lens $L_2$ and mold halves 40, 40a which are releasably held together by suitable clamping means not shown. The mold halves 40, 40a may be internally lined with a conventional release agent to prevent a bonding of the plastic material thereto. The annular lens $L_1$, on being thus cast and hardened, adheres to the glass lens $L_2$ and together with it may be removed from the mold upon a separation of half-shell 40, 40a and deflation of retaining heads 41.

The composite body $11'$, $L_2'$ of FIG. 3 may be formed in analogous manner by prefabricating its component of higher refractive index, i.e. prism $11'$, from glass and complementing it with a suitably shaped mold so as to leave a toric cavity conforming to the configuration of lens $L_2'$ which is then molded therein onto the body $11'$.

The concentric annular optical system herein disclosed, and the manner just described of making composite refractive elements for such system, has utility beyond that of a panoramic viewer or omnidirectional light source referred to at the outset. Thus, for example, such a system may be used for the irradiation of a laser crystal centrally disposed therein at the location of the elements 11, $11'$ in FIGS. 1–3.

I claim:

1. A panoramic optical objective comprising an annular afocal lens system, an axially symmetrical reflecting element aligned with said lens system and having at least one substantially conical reflecting surface so inclined with reference to the axis of said element as to reflect in a generally axial direction all incident rays arriving from said annular lens system, and a lens member for focusing rays reflected from said surface onto an image plane, said annular lens system including at least one annular component of negative refractivity in all planes containing said axis and bounded by two air spaces and spacedly surrounding said element, and a further annular component of positive refractivity between said annular component of negative refractivity and said element, said components forming an afocal system.

2. An objective as defined in claim 1 wherein said element is an annular prism.

3. An objective as defined in claim 2 wherein said generatrices include with all said incident rays an angle less than the critical angle of the prism material whereby complete internal reflection occurs along said conical surface.

4. An objective as defined in claim 3 wherein said prism is provided with a substantially conical bore defining said reflecting surface, further comprising a transparent insert complementary to said bore closely spaced from said reflecting surface for directing incident rays of substantially axial orientation past said surface through said prism.

5. An objective as defined in claim 4 wherein said insert is removably positioned in said bore.

6. An objective as defined in claim 2 wherein said lens member is integral with said prism.

7. An objective as defined in claim 2 wherein said annular component of positive refractivity is constituted at least in part by a lens of substantially circular cross-section.

8. An objective as defined in claim 2 wherein said prism has two internal reflecting surfaces positioned for successive impingement by said radially incident light rays.

9. An objective as defined in claim 1 wherein said reflecting element is a double cone with a common horizontal base and an apex angle of substantially 90° at each end.

10. An objective as defined in claim 1, further comprising an annular ray-transposing prism centered on said axis and having a conical inner reflecting surface axially aligned with said reflecting element in the path of radially incident light rays refracting at said conical surface, and a reflecting insert within said ray-transposing prism.

References Cited by the Examiner

UNITED STATES PATENTS

| | | | |
|---|---|---|---|
| 2,373,246 | 4/1945 | Johnston | 65—37 |
| 2,638,033 | 5/1953 | Buchele et al. | 88—57 |
| 2,807,122 | 9/1957 | Upton | 65—37 |
| 2,964,997 | 12/1960 | Van Heel et al. | 88—57 |
| 3,151,524 | 10/1964 | Bouwers | 88—57 |

FOREIGN PATENTS

| | | |
|---|---|---|
| Ad. 15,622 | 6/1912 | France. |
| 1,184,963 | 2/1959 | France. |
| 283,493 | 2/1914 | Germany. |

JEWELL H. PEDERSEN, *Primary Examiner.*

JOHN K. CORBIN, *Examiner.*

R. J. STERN, *Assistant Examiner.*